Figure 1:
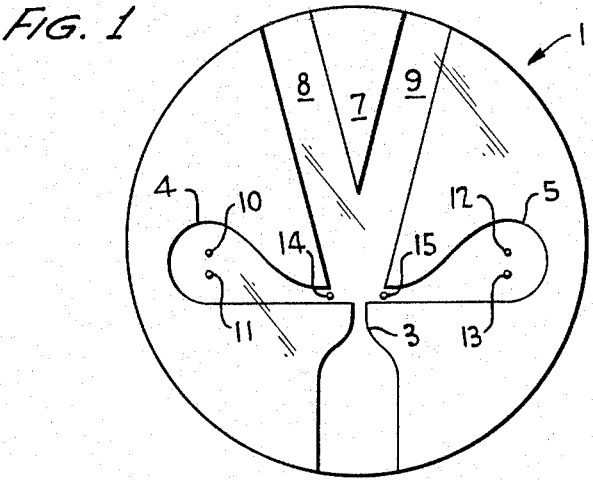

Aug. 2, 1966   K. R. SCUDDER ETAL   3,263,695
ELECTRO-PNEUMATIC TRANSDUCER
Filed March 19, 1964

INVENTORS,
KENNETH R. SCUDDER
CARL J. CAMPAGNUOLO
LEON B. KATCHEN
BY: Harry M. Saragovitz, Edward J. Kelly,
Herbert Berl & J.D. Edgerton

3,263,695
ELECTRO-PNEUMATIC TRANSDUCER

Kenneth R. Scudder, Chevy Chase, Md., and Carl J. Campagnuolo and Leon B. Katchen, Washington, D.C., assignors to the United States of America as represented by the Secretary of the Army
Filed Mar. 19, 1964, Ser. No. 353,305
6 Claims. (Cl. 137—81.5)

The invention described herein may be manufactured and used by or for the Government of the United States of America for governmental purposes without the payment to us of any royalty thereon.

This invention relates generally to fluid amplifiers, and more particularly to the control of fluid amplifiers by means of a spark discharge.

A basic understanding of fluid amplifiers may be obtained from the following two articles which appear in the Proceedings of the Fluid Amplification Symposium, vol. 1, Oct. 1962, published by the Diamond Ordnance Fuze Laboratories: "Wall Effect and Binary Devices," by R. W. Warren, pages 11 to 20; and "An Introduction to Proportional Fluid Control" by Silas Katz, pages 21 to 26. One of the important advantages of a pure fluid system is that the response time of the system is limited only by the speed of sound in the acoustic media employed. For example, the switching time of a bi-stable pneumatic amplifier has been shown to be in the order of several hundred microseconds. Such fast response is due to the fact that these systems contain no moving parts. However, in order to switch a system of pure fluid elements it has heretofore been necessary to supply the first unit of the system with a fluid control signal. This signal is usually supplied by means of a valve. Of course, a valve is a moving part, and hence in practice the systems developed have not been completely free of moving parts. The introduction of a moving part into an otherwise pure fluid system greatly lowers the reliability and the response time of the system. Thus, the need is apparent for a way to switch pure fluid systems without the use of moving parts in order to take full advantage of the fast response time and high reliability inherent in these systems.

In addition to the need for eliminating all moving parts in fluid amplifier systems, the widespread use of electronics in control systems has created a need for a pure fluid element which can be controlled by an electrical input signal. For example, pure fluid elements connected together to obtain an amplified fluid signal can be used to control a high speed jet such as that generated by a rocket. A fluid element which can be controlled by an electrical input signal would make it possible to introduce into the pure fluid system an electrical signal from a gyroscope or other guidance sensor and deflect by secondary injection methods the main exhaust jet of the rocket. In addition, such an element would make possible the interacting of fluid elements and electrical elements in computer applications.

It is an object of this invention to eliminate all moving parts from fluid amplifier systems thereby obtaining the full advantages of these systems.

It is another object of this invention to provide a fluid element which may be controlled by an electrical signal.

It is a further object of the present invention to provide a means for controlling wall effect fluid amplifier units with an electrical input signal.

It is yet another object of the instant invention to provide a means for controlling momentum exchange fluid amplifier units with an electrical input signal.

It is still another object of this invention to provide an electrical to fluid transducer.

According to the invention, the foregoing and other objects are attained by providing within a pure fluid element a pair of electrodes between which a spark discharge is made to occur by any convenient electrical circuitry. The spark discharge creates a shock wave and a thermal expansion which acts upon the power jet of the element and causes the jet to deflect.

Figure 2:
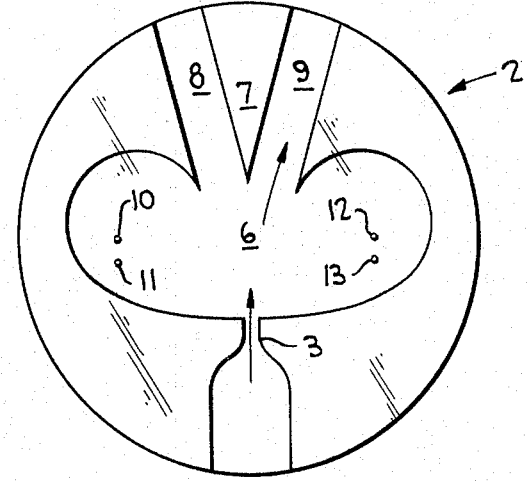

The specific nature of the invention, as well as other objects, aspects, uses and advantages thereof, will clearly appear from the following description and from the accompanying drawing, in which:

FIG. 1 is an illustration of a wall effect fluid amplifier showing the placement of electrodes for controlling the power jet; and FIG. 2 is an illustration of a momentum exchange fluid amplifier showing the placement of electrodes for controlling the power jet.

The description is limited to the control of the bi-stable fluid amplifier of the wall effect type and the proportional fluid amplifier of the momentum exchange type; however, the invention described is equally applicable to other fluid elements such as, for example, oscillators and various types of logical units. A particular logical unit to which the invention is applicable is described in the article entitled, "Pure Fluid Digital Logic with a Single Switching Element," by Peter Bower which appears on pages 405 to 413 of the above identified publication.

Referring now to the drawing wherein like reference numerals designate identical or corresponding parts throughout the several views, and more particularly to FIGURE 1 wherein there is shown a wall effect amplifier 1 having a nozzle 3, which develops a power jet, and two small pockets 4 and 5 on either side of the power jet. The power jet enters an interaction or expansion chamber 6 upon emanating from nozzle 3. Downstream from the power jet is a stream splitter 7. The stream splitter 7 in combination with the walls of the expansion chamber 6 defines two output passages 8 and 9.

The operation of the fluid amplifier shown in FIGURE 1 is analogous to an electronic flip-flop. The power jet generated by the nozzle 3 attaches to one or the other of the two sides of the expansion chamber 6. This phenomenon is known as the Coanda effect. Assume the jet attaches to the left wall of the expansion chamber 6 and therefore exists by way of output passage 8. If a fluid pressure is made to act upon the jet in a direction perpendicular to the jet in the vicinity of the pocket 4, the jet is made to attach to the right wall of the expansion chamber 6, and it exists by way of output passage 9. Thus, the stream is made to switch between the outputs 8 and 9 by application of fluid signals perpendicular to the power jet.

The invention provides for the control of the power jet by an electrical signal by the provision of electrodes 10 and 11 in pocket 4 and electrodes 12 and 13 in pocket 5. A spark discharge is made to occur between either the electrode pair 10 and 11 or the electrode pair 12 and 13 by any suitable electric circuitry. By way of example, such circuitry may take the form of an inductance coil, battery and switch or may take the form of a capacitor bank, battery and switch. The shock wave and the thermal expansion caused by the spark discharge causes the fluid in the vicinities of the electrode pairs to impinge upon the jet stream causing it to deflect and attach to the opposite wall from which spark discharge occurred. Thus, a spark discharge between electrode pair 10 and 11 in pocket 4 causes the jet to exit by way of output passage 9, and a spark discharge between electrode pair 12 and 13 in pocket 5 causes the jet to exit by way of output passage 8.

The operation of the bistable fluid amplifier shown in FIGURE 1 as described using electrode pairs 10 and 11, and 12 and 13 is analogous to an asymmetrically triggered bistable multivibrator. By employing electrodes 14 and 15 on either side of the power jet, symmetrical switching of the jet between outputs 8 and 9 is accomplished analogous to a symmetrically triggered bistable multivibrator. A spark discharge between the electrode pair 14 and 15 causes the jet to switch to the opposite wall of the expansion chamber 6 from which is was attached just prior to the spark discharge. The spark discharge must be of short duration since the power jet will oscillate between the outputs 8 and 9 in a sporadic manner if the discharge is maintained.

Referring now to FIGURE 2 wherein there is shown a momentum exchange amplifier 2 having a nozzle 3 which develops a power jet. The power jet enters an expansion chamber 6 which is shaped in such a manner as to prevent the Coanda effect from occurring. Downstream from the power jet is a stream splitter 7 which together with the walls of the expansion chamber 6 defines output passages 8 and 9. In the absence of any influence on the power jet, the stream splitter 7 divides the jet equally between outputs 8 and 9. A fluid pressure signal acting upon the power jet in a direction perpendicular to the jet causes the jet to deflect away from the pressure signal. Momentum is conserved in the system and the jet flows at an angle whose tangent is a function of the momentum of the pressure signal and the momentum of the power jet.

The invention provides for the proportional control of momentum exchange fluid amplifier units by the provision of electrodes 10 and 11 in the left-hand portion of expansion chamber 6 and electrodes 12 and 13 in the right-hand portion of expansion chamber 6. In a manner similar to that explained in connection with FIGURE 1, a spark discharge between the electrode pair 10 and 11 causes the power jet to deflect to the right, while a spark discharge between the electrode pair 12 and 13 causes the power jet to deflect to the left. Unlike the jet in the amplifier shown in FIGURE 1, the jet in the amplifier shown in FIGURE 2 does not remain deflected but returns to divide evenly between the outputs 8 and 9 when the spark discharge has ceased. By causing a series of spark discharges between an electrode pair, the jet is deflected a certain angle. This angle is proportional to the frequency of the spark discharges. The angle of deflection of the power jet may also be controlled by varying the intensity of the spark discharges.

From the foregoing description it is apparent that the invention eliminates the use of moving parts in a pure fluid system and additionally provides control of pure fluid systems by electrical signals thereby allowing the interaction of fluid and electrical systems. It will be apparent that the embodiments shown are only exemplary and that various modifications can be made in construction and arrangement of the invention as defined in the appended claims.

We claim as our invention:

1. In a bistable fluid amplifier of the wall effect type having nozzle means connected to a source of fluid power for producing a power jet, means forming a pair of output passages for receiving said power jet, and means defining an interaction chamber interposed between said nozzle means and said output passages including a pair of boundary walls associated respectively with said output passages, improved control means for said amplifier comprising:
   (a) means defining a pair of pockets associated respectively with said boundary walls each terminating in a control port of reduced dimensions adjacent said nozzle means,
   (b) said ports providing fluid communication between said interaction chamber and said pockets, and
   (c) means located in each of said pockets remote from said interaction chamber and said power jet for producing an electrical spark discharge operable to selectively switch said power jet from one of said output passages to the other.

2. In the fluid amplifier of claim 1, said spark producing means comprising a pair of electrodes.

3. In a bistable fluid amplifier of the wall effect type having nozzle means connected to a source of fluid power for producing a power jet, means forming a pair of output passages for receiving said power jet, and means defining an interaction chamber interposed between said nozzle means and said output passages including a pair of boundary walls associated respectively with said output passages, electrically operated control means for symmetrically switching said power jet comprising:
   (a) means adjacent said nozzle means for producing a spark discharge across said power jet,
   (b) said power jet being switched from one output passage to the other each time a spark is produced thereby changing the state of said amplifier.

4. In the bistable fluid amplifier according to claim 3, said spark producing means comprising a first electrode positioned on one side of said power jet and a second electrode positioned on the opposite side thereof.

5. In a proportional fluid amplifier of the momentum exchange type having nozzle means connected to a source of fluid power for producing a power jet, means forming a pair of output passages for receiving said power jet, and means defining an interaction chamber interposed between said nozzle means and said output passages including a pair of setback walls for preventing wall effects from occurring, improved control means for said amplifier comprising:
   (a) means located in the regions of said chamber defined by said setback walls and remote from said power jet for producing electrical spark discharges operable to cause deflection of said power jet,
   (b) the angle of said deflection varying directly with the frequency and the intensity of said spark discharges, whereby
   (c) the output of said amplifier is proportional to the frequency and the intensity of said spark discharges.

6. In the proportional fluid amplifier set forth in claim 5, said spark producing means comprising a pair of electrodes positioned in each of said regions.

References Cited by the Examiner

UNITED STATES PATENTS

| | | | |
|---|---|---|---|
| 3,122,062 | 2/1964 | Spivak et al. | 137—81.5X |
| 3,158,166 | 11/1964 | Warren | 137—815 |
| 3,168,897 | 2/1965 | Adams et al. | 137—81.5 |
| 3,182,686 | 5/1965 | Zilberfarb | 137—81.5X |
| 3,187,762 | 6/1965 | Norwood | 137—81.5 |

M. CARY NELSON, *Primary Examiner.*

S. SCOTT, *Assistant Examiner.*